J. KARSTEN.
BARREL LIFTING DEVICE.
APPLICATION FILED AUG. 28, 1916.

1,229,090.

Patented June 5, 1917.

Inventor
J. Karsten.
By Victor J. Evans
Attorney

J. KARSTEN.
BARREL LIFTING DEVICE.
APPLICATION FILED AUG. 28, 1916.

1,229,090.

Patented June 5, 1917.
2 SHEETS—SHEET 2.

Witnesses

Inventor
J. Karsten.
By Victor J. Evans
Attorney

UNITED STATES PATENT OFFICE.

JOSEPH KARSTEN, OF CHOKIO, MINNESOTA.

BARREL-LIFTING DEVICE.

1,229,090.  Specification of Letters Patent.  Patented June 5, 1917.

Application filed August 28, 1916. Serial No. 117,287.

*To all whom it may concern:*

Be it known that I, JOSEPH KARSTEN, a citizen of the United States, residing at Chokio, in the county of Stevens and State of Minnesota, have invented new and useful Improvements in Barrel-Lifting Devices, of which the following is a specification.

This invention has for its object the provision of a barrel stand embodying a holder normally supporting the barrel in upright position, but mounted to move in an arc of a circle so that the barrel can be elevated with the least effort to a horizontal position when it is desired to discharge its contents, or any portion thereof, the device in its entirety being constructed to firmly support the barrel in its horizontal position.

The nature and advantages of the invention will be better understood when the following description is read in connection with the accompanying drawings, the invention residing in the construction, combination and arrangement of parts as claimed.

In the drawings forming part of this specification like numerals of reference indicate similar parts in the several views and wherein:—

Figure 1:
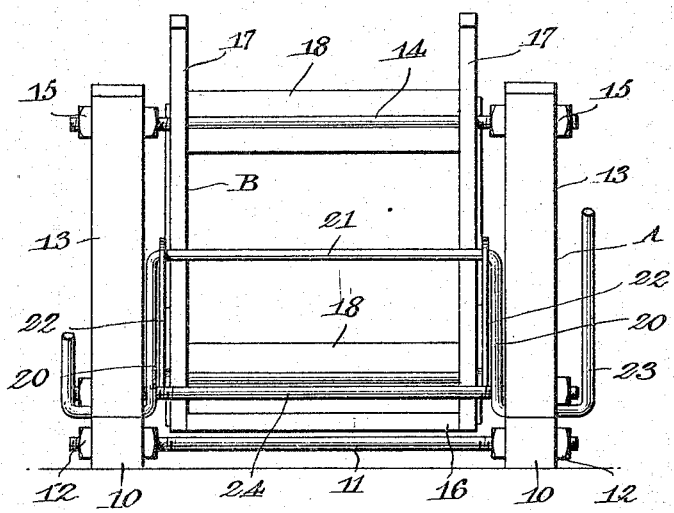
Figure 1 is a front elevation of the stand constructed in accordance with my invention showing the parts in normal position.

A stand constructed in accordance with my invention includes a frame indicated generally by A and consisting of spaced parallel members 10 which are connected and substantially reinforced by means of transverse bars 11, the latter being secured to the members 10 in any suitable manner, preferably by having their extremities threaded to accommodate nuts 12. Rising from each member 10 is a standard 13, these standards being connected together by a transverse bar 14. The bar 14 is disposed adjacent the upper extremities of the standards, and while it can be secured to the latter in any suitable manner it preferably has its extremities threaded to accommodate the nuts 15. The bar 14 in addition to bracing the standards 13 provides a pivot for the barrel holder or support indicated generally at B.

The holder B as shown in this instance includes a bottom 16, spaced parallel side members 17, which have arranged therebetween backing members 18, the latter being disposed in spaced relation and concave to conform to the curvature of the barrel. The parallel side members 17 are provided with suitable openings through which the rod 14 is passed, the holder being loosely mounted upon the rod to be moved in an arc of a circle in the manner to be presently described. The holder manifestly occupies normally, the position illustrated in Fig. 1.

Secured upon the members 10 of the frame at one side of the standards 13 are bearings 19 in which the extremities 20 of the crank shaft are journaled, the crank portion 21 thereof being connected with the holder B through the instrumentality of links 22, there being two of these links employed, each having their forward corresponding extremities pivotally associated with the crank portion 21 of the shaft, and their opposite extremities similarly connected with the side members of the holder. One terminal of the crank shaft is continued to provide a handle 23 by means of which the crank shaft can be easily operated to adjust the holder B from its normal to its active position when desired.

Figure 2:
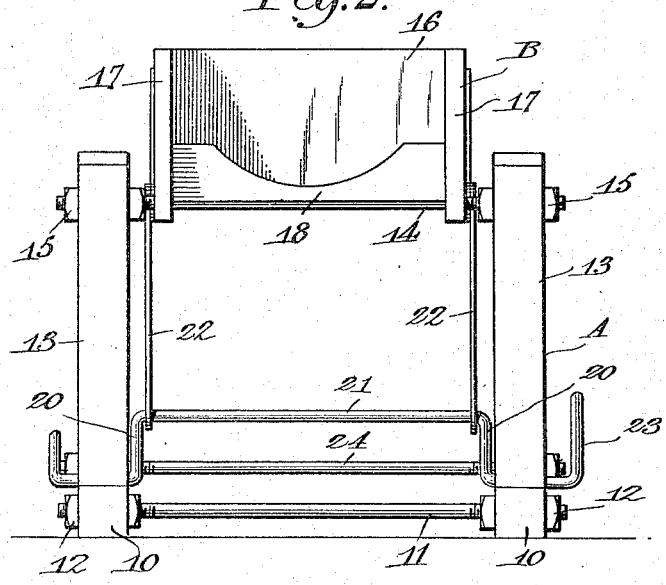
Fig. 2 is a similar view showing the parts in active position.
Figure 4:
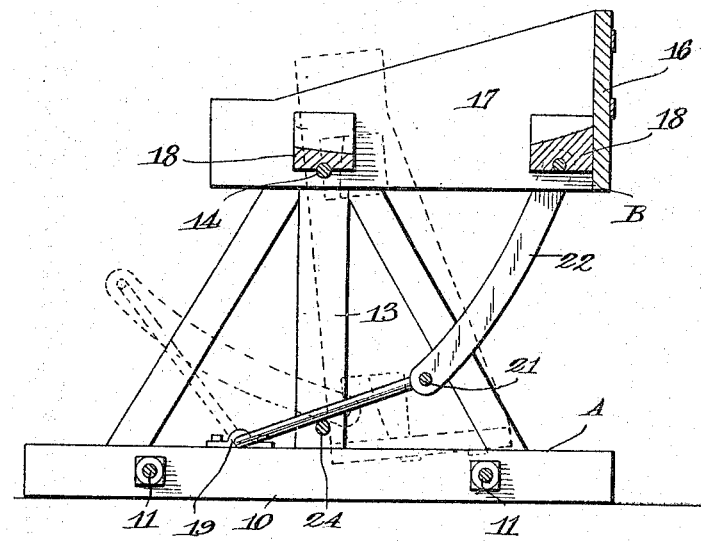
Fig. 4 is a side elevation showing certain of the parts in section.
Figure 3:
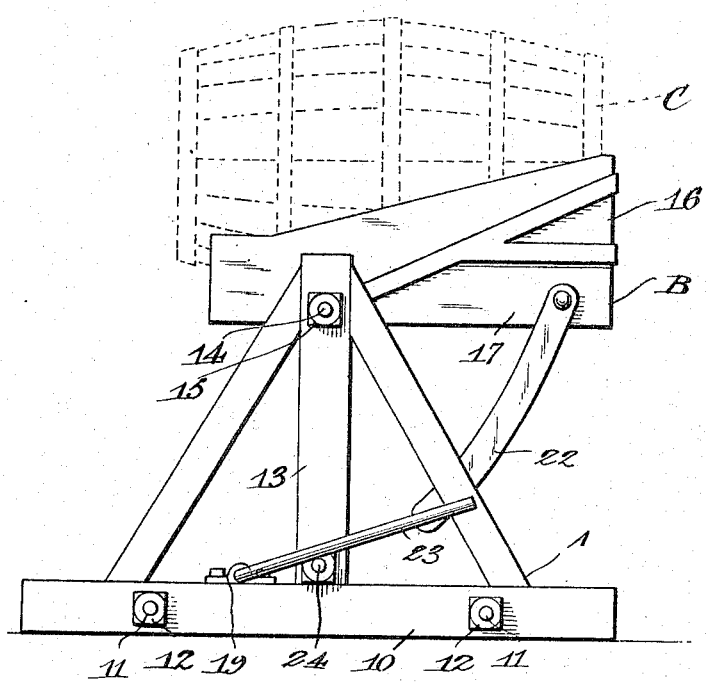
Fig. 3 is a side elevation showing the parts in active position, the barrel being shown in dotted lines.

In practice, the parts are normally in the position illustrated in Fig. 1, the barrel C being supported upon the holder B in an upright position with the crank portion of the shaft and the handle 23 projecting forwardly. When it is desired to elevate the barrel for the purpose of discharging a portion or all of its contents therefrom, the handle 23 is moved rearwardly together with the crank portion 21 of the shaft, and through the instrumentality of the links 22 the holder B is swung upon the bar 15 to a horizontal position as clearly illustrated in Figs. 2 and 3.

Positioned between the parallel standards 13 and suitably connected therewith adjacent their lower extremities, is a transverse rod 24, which in addition to reinforcing or bracing the standards functions to limit the movement of the crank portion 21 of the shaft. When the crank portion 21 is brought into engagement with the rod 24, the holder has assumed its active position, the rod 24 further serving as a support to rigidly maintain the holder and its associated parts in their adjusted position.

While it is believed that from the foregoing description the nature and advantages of the invention will be readily apparent I desire to have it understood that the same is merely illustrative of the preferred embodiment of the invention to which I do not limit myself, and that such changes may be resorted to when desired as fall within the scope of what is claimed.

What is claimed is:—

1. A device of the class described, a frame including spaced parallel standards, a reinforcing rod connecting said standards, a barrel support swingingly mounted on said rod, a crank shaft journaled on the frame, a connection between said shaft and the barrel support for moving the latter from a vertical to a horizontal position and vice versa on reverse movements of the shaft, and means for holding said support in its elevated or horizontal position.

2. A device of the class described, a frame including spaced parallel standards, a reinforcing rod connecting said standards, a barrel support swingingly mounted on said rod, a crank shaft journaled on the frame, a connection between said shaft and the barrel support for moving the latter from a vertical to a horizontal position and vice versa on reverse movements of the shaft, and a second reinforcing rod connecting said standards, said rod being disposed in the path of movement of said shaft to engage the latter and hold said support in its elevated or horizontal position.

In testimony whereof I affix my signature.

JOSEPH KARSTEN.

Copies of this patent may be obtained for five cents each, by addressing the "Commissioner of Patents, Washington, D. C."